June 19, 1928.
A. L. M. PIRRONE
1,674,263
APPARATUS FOR CLEANING AND POLISHING PLATE GLASS
Filed Oct. 21, 1926
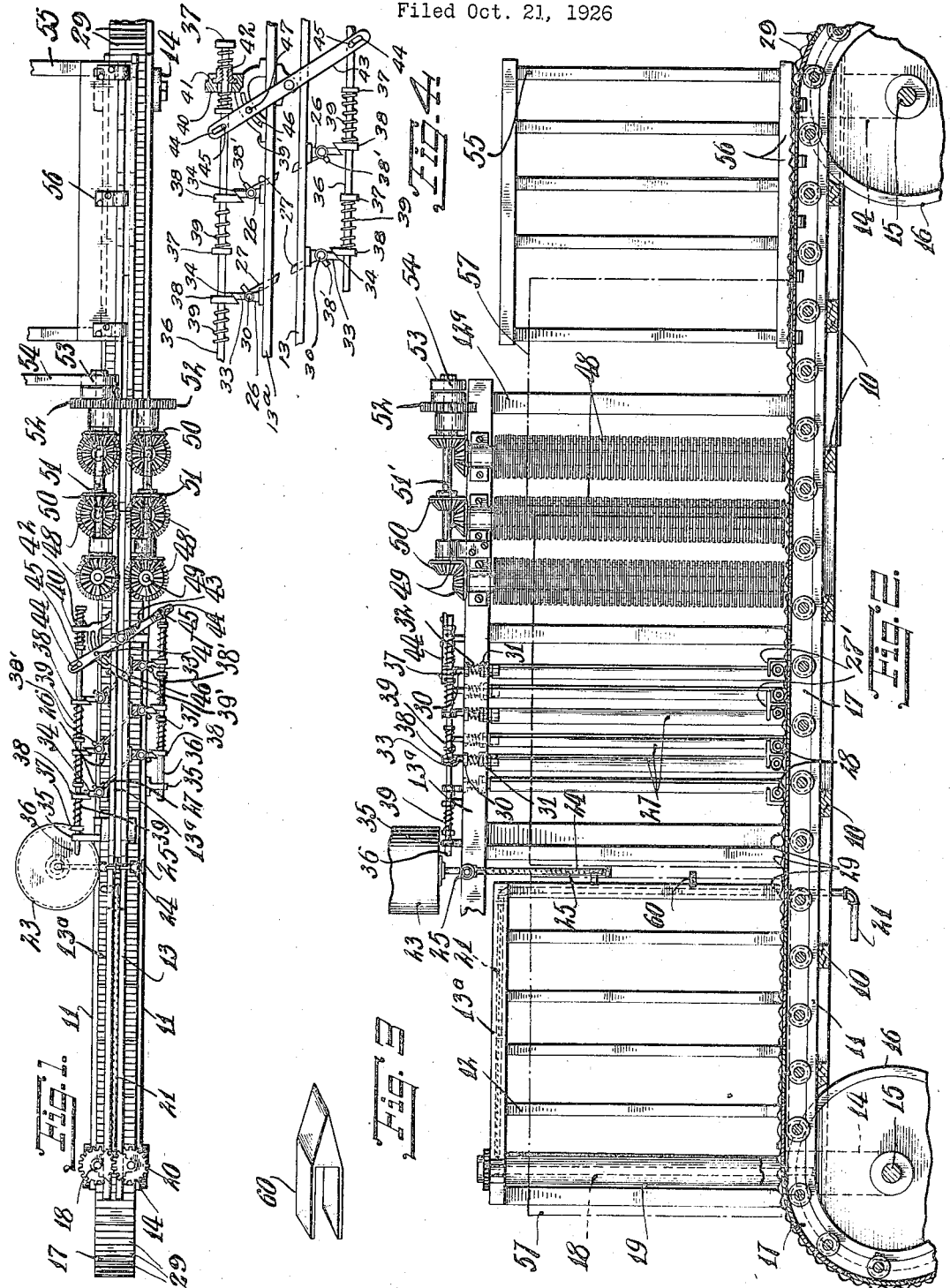
INVENTOR
Antonino L. M. Pirrone
BY
ATTORNEY Patented June 19, 1928.

1,674,263

UNITED STATES PATENT OFFICE.

ANTONINO L. M. PIRRONE, OF NEW KENSINGTON, PENNSYLVANIA, ASSIGNOR OF ONE-HALF TO HARRY A. KLINGENSMITH, OF NEW KENSINGTON, PENNSYLVANIA.

APPARATUS FOR CLEANING AND POLISHING PLATE GLASS.

Application filed October 21, 1926. Serial No. 143,045.

This invention relates generally to an improved apparatus for cleaning, drying and polishing large sheets of glass, known in the art as "French glass".

The invention has for an object the provision of an improved apparatus which will clean, polish and place in certain positions for convenience of transportation to other points, plates of glass.

For further comprehension of the invention, and of the objects and advantages thereof, reference will be had to the following description and accompanying drawings, and to the appended claims in which the various novel features of the invention are more particularly set forth.

Referring to the accompanying drawings forming a material part of this disclosure:

Fig. 1 is a plan view of an apparatus constructed according to this invention.

Fig. 2 is a sectional side elevation thereof.

Fig. 3 is a perspective view of one of the spring clips used for entering the plates of glass between the scrapers.

Fig. 4 is an enlarged fragmentary view of Fig. 1.

The reference numeral 10 indicates several transverse bottom boards, fastened to a pair of vertical boards 11, from which several boards 12, 12ª extend upwards, and support at their top ends boards 13, 13ª. The vertical boards 11, boards 12 and 12ª, and boards 13 and 13ª form a pair of frames spaced by the transverse boards 10, and these frames act as vertical supports and guides. The boards 11 have depending at their ends, brackets 14, rotatably supporting shafts 15, carrying wheels 16 which engage a flexible belt 17. Mounted between boards 11 and 13 are shafts 18, supporting rollers 19. Fixed to the upper ends of shafts 18 are meshing gears 20.

A pipe 21, connecting with a source of cleaning fluid, is led to the top of the device, between the boards 13. The pipe 21 has a plurality of apertures 22 formed on the bottom portion of that portion of the pipe which extends between boards 13. A tank 23 having a number of pipes 24 extending on both sides of the boards 13ª, and equipped with valves 25, is suitably supported to the boards 13ª. The pipes 24 are formed with apertures 25' on the side towards the boards 13ª.

The boards 13ª have a plurality of brackets 26 mounted thereon, and pivotally supporting scrapers 27 formed with rollers 28 on their lower ends. The rollers 28 engage against cam elements 29 of flexible construction and suitably fastened to belt 17. The scrapers 27 are formed with shafts 30 at their pivotal points, and fixed on the shafts are collars 31, while co-axially on the shafts are springs 32 acting against the collars 31 and the board 13ª normally urging the rollers 28 of the scrapers against the cam elements. Arms 33 project from the shafts 30, and are formed with cam faces 34. Fastened to the boards 13 are brackets 35 which slidably support rods 36 having collars 37 fixed thereon, and cams 38 slidably mounted thereon. Springs 39 act between the collars 37 and the cams to urge the cams against the cam faces 34 of the arms 33. Stops 38' project from the brackets 26 limiting the turning motion of arms 33 using shafts 30 as pivots so as to make it impossible for the cam 38 to slip past cam faces 34. Also fastened to the board 13ª is a bracket 39' having a projection 40 with an aperture 41 permitting the free passage of one end of the rod 36. The projection 40 has rotatably attached thereto a bushing 42 formed with threads threadedly engaging other threads formed on rod 36 so that the bushing may be rotated to longitudinally adjust the rod 36 which causes a change of pressure of the springs 39 against the cams 38. A lever 43 is pivotally mounted intermediate of its ends to boards 13ª, and is formed near its ends with elongated apertures 44. Pins 45 project from the rods 36 and engage in the apertures 44. The bracket 39' is formed with an arcuate slot 46, and the lever 43 has a wing fastened nut 47 engaging in the arcuate slot to lock the lever in adjusted positions. Guides 27' slidably support the lower ends of the scrapers 27 so that the scrapers may move vertically, and these guides are secured to the tops of boards 11. Several brushes 48 are rotatably mounted to the boards 13ª, and carry at their upper ends bevel gears 49 meshing with other bevel gears 50 on shafts 51 rotatably supported to boards 13ª, and having meshing spur gears 52. One of the shafts 51 has fixed thereon a pulley 53 engaged by a belt 54 connected with some source of motion not shown on the drawings.

A frame 55 has hinges 56 at its lower end connecting with boards 11.

In the operation of the device, plates of glass, indicated by the dash dot lines 57 are inserted between rollers 19, and the bottom edges rest on the belt 17. The belt 17 having previously been set in motion by some source of power turning one of the wheels 16, causes the plates of glass to advance. Suitable cleansing fluid sprays from the apertures 21 upon the plates. By the proper manipulation of valves 25 a solution of a suitable acid and water from tank 23 may be sprayed upon the plates. Wedge shaped clips 60 are placed on the front edge of the plates, and as the plates advance the clips force the scrapers 27 apart allowing the plates to enter therebetween. The scrapers are forced against the plates by means of the spring 39, and at the same time the scrapers have a vertical ascending and descending motion due to the spring 32 and the cams 29. The brushes 48 next thoroughly brush the plates and finally the plates reach the frame 55 which is then lowered to a horizontal position to permit a convenient removal thereof.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. In a device of the class described, the combination with spaced vertical frames pivotally and slidably supporting scrapers, of shafts projecting axially from the pivotal points of said scrapers, arms projecting laterally from said shafts, cam faces formed on the ends of said arms, brackets mounted on said frames, rods slidable in said brackets, collars fixed to said rods, cam elements slidable on said rods, springs acting between said collars and cam elements normally urging said cam elements against said cam faces, another bracket mounted on one of said frames, a projection on said last named bracket, said projection being formed with an aperture, one of the said rods being slidable in said aperture, a bushing rotatable in said aperture, said bushing threadedly engaging the end of said rod projecting thru said aperture, a lever pivoted intermediate of its ends to said frames, the ends of said lever being connected to said rods, and means for locking said lever in various positions.

2. In a device of the class described, the combination with spaced vertical frames pivotally and slidably supporting scrapers, of shafts projecting axially from the pivotal points of said scrapers, arms projecting laterally from said shafts, cam faces formed on the ends of said arms, brackets mounted on said frames, rods slidable in said brackets, collars fixed to said rods, cam elements slidable on said rods, springs acting between said collars and cam elements normally urging said cam elements against said cam faces, another bracket mounted on one of said frames, a projection on said last named bracket, said projection being formed with an aperture, one of the said rods being slidable in said aperture, a bushing rotatable in said aperture, said bushing threadedly engaging the end of said rod projecting thru said aperture, a lever pivoted intermediate of its ends to said frames, the ends of said lever being connected to said rods, and means for locking said lever in various positions, said means consisting of a wing nut device on said lever, engaging an arcuate slot in said latter mentioned bracket.

3. In a device of the class described, having a belt to advance glass plates, the combination of scrapers engageable with said glass plates, means for adjusting the pressure of said scrapers against said plates, a cam element on said belt, and means for urging said scrapers to co-act with said cam element to cause said scrapers to vertically ascend and descend.

In testimony whereof I have affixed my signature.

ANTONINO L. M. PIRRONE.